UNITED STATES PATENT OFFICE.

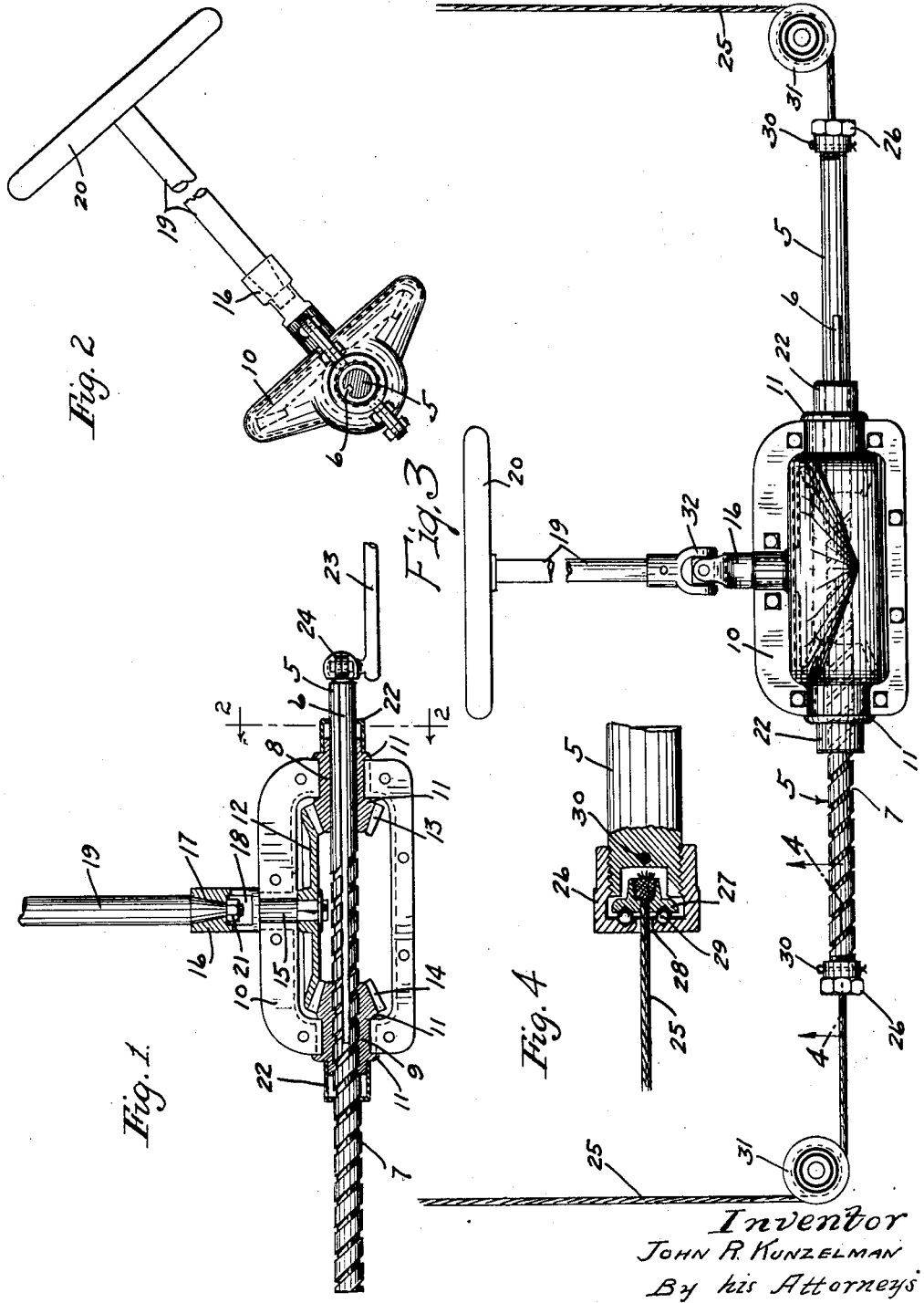

JOHN R. KUNZELMAN, OF IRON RIVER, WISCONSIN.

STEERING MECHANISM FOR MOTOR-DRIVEN VEHICLES.

1,370,653.   Specification of Letters Patent.   Patented Mar. 8, 1921.

Application filed April 5, 1920. Serial No. 371,223.

*To all whom it may concern:*

Be it known that I, JOHN R. KUNZELMAN, a citizen of the United States, residing at Iron River, in the county of Bayfield and State of Wisconsin, have invented certain new and useful Improvements in Steering Mechanism for Motor-Driven Vehicles; and I do hereby declare the following to be a full, clear, and exact description of the invention, such as will enable others skilled in the art to which it appertains to make and use the same.

My invention has for its object to provide an extremely simple and highly efficient steering mechanism for motor-driven vehicles, and to this end, it consists of the novel devices and combinations of devices hereinafter described and defined in the claims.

In the accompanying drawings, which illustrate the invention, like characters indicate like parts throughout the several views.

Referring to the drawings:—

Figure 1 is a view partly in elevation and partly in section illustrating the invention incorporated in a steering mechanism of an automobile;

Fig. 2 is a view principally in side elevation with some parts sectioned on the line 2—2 of Fig. 1;

Fig. 3 is an elevation illustrating the invention incorporated in a steering mechanism of an aeroplane or boat; and Fig. 4 is a detail view with some parts sectioned on the line 4—4 of Fig. 3, on an enlarged scale.

The invention includes a steering rod 5 having formed on one end portion thereof a long key-way 6, and on the other end portion thereof a relatively coarse screw-thread 7, and it is important to note that said key-way and screw-thread extend the one into the other, as shown in Fig. 1. Mounted on the end of the steering rod 5, having the key-way 6, is a driving sleeve 8, and on the other end thereof is a nut-acting sleeve 9. These sleeves 8 and 9 are journaled in bearings formed in a two-part oil-tight housing 10 rigidly secured to the body of an automobile or other vehicle. Axially spaced shoulders 11, on the sleeves 8 and 9, are arranged to engage the outer and inner faces of the housing 10 to hold said sleeves against axial movement in respect to said housing. The sleeves 8 and 9 are simultaneously and reversely driven by a large bevel gear 12, which meshes with a pair of opposing bevel pinions 13 and 14 formed respectively on the inner ends of the sleeves 8 and 9.

The gear 12 is rigidly secured to a short shaft 15 journaled in a bearing in the housing 10 and held against axial movement by the hub of said gear and a shoulder head 16 on the outer projecting end of said shaft. This head 16 has, in its outer end, a tapered axial bore 17, which opens into a transverse opening 18 is said head to receive the tapered lower end of a steering shaft 19 having on its upper end a steering wheel 20. The steering shaft 19 is rigidly secured in the head 16 by a nut 21, in the transverse opening 18, having screw-threaded engagement with the lower projecting end of said steering shaft. On the outer projecting ends of the sleeves 8 and 9 are caps 22 adapted to hold a suitable packing to prevent the leakage of oil from the housing 10 around the steering rod 5, and in which oil, the gears 12, 13 and 14, and the covered portion of the steering rod 5 run.

The end of the steering rod 5, in which the key-way 6 is formed, is connected to a steering link 23 by a ball and socket joint 24, which permits the rotation of said steering rod in respect to the steering link. This steering link 23 is a part of standard automobile steering mechanism and may be connected to the arm on one of the stub axles or the tie-rod connecting the arms of said stub axles.

In Fig. 3, the steering rod 5 is shown interposed between and swiveled to a pair of oppositely extended cables 25, which may be connected to the ailerons, elevators or rudder of an aeroplane, or the rudder of a boat. The steering rod 5 is swiveled to the cables 25 by recessing the ends of said steering rod and screwing thereon caps 26 having therein swiveled anchoring heads 27, to which the cables 25 are attached. Axial openings 28 are formed in the caps 26, for the cables 25, and anti-friction balls 29 are interposed between the caps 26 and anchoring heads 27. Cotter pins 30, extending through alined bores in the steering rod 5 and caps 26, are provided to prevent turning movement of said caps on the steering rod, under the swivel action of the anchoring heads 27. The cables 25 are arranged to run over guide sheaves 21 and the purpose of the swiveled anchoring head 27 is to prevent twisting of said cables under the rotation of the steering rod 5. In Fig. 3, the steering shaft 19 is shown as being flexibly connected to the head 16 by a universal joint 32.

From the above description, it is evident that the driving sleeve 8 and nut-acting sleeve 9, operating on the steering rod 5, will impart an endwise movement thereto at twice the speed at which the pinions 13 and 14 are moving. By the use of the improved steering mechanism, a vehicle may be set to run in a given direction and said vehicle will continue to run in the same direction until again changed by the steering mechanism, thus leaving the operator's hands free. By extending the key-way 6 and the screw-thread 7 into each other, an endwise movement of the steering rod 5 may be obtained, that is materially greater than the distance between the pinions 13 and 14 for the reason that said screw-thread is free to move into and out of the driving sleeve 8.

In actual usage, the above described invention has proven highly efficient for the purpose had in view.

By reference to Fig. 1, it will be noted that the key-way 6 extends to the ball and socket joint 24 and thereby acts as a reservoir for conveying a lubricant to said ball and socket joint.

What I claim is:—

1. The combination with a steering element, of a steering rod attached to the steering element, a driving sleeve and a nut-acting sleeve mounted on the steering rod and held against axial movement, means including a key-way in the steering rod for securing the driving sleeve to the steering rod for rotation therewith, but with freedom for axial sliding movement thereon, said nut-acting sleeve having screw-threaded engagement with the steering rod, said key-way and the screw-threads on the steering rod being extended the one into the other, whereby the screw-threads on the steering rod may travel into and out of the driving sleeve, and means for simultaneously driving the driving sleeve and nut-acting sleeve in reverse direction.

2. The combination with a steering element, of a steering rod swiveled to the steering element, a driving sleeve and a nut-acting sleeve mounted on the steering rod and held against axial movement, means including a key-way in the steering rod for securing the driving sleeve to the steering rod for rotation therewith, but with freedom for axial sliding movement thereon, said nut-acting sleeve having screw-threaded engagement with the steering rod, said key-way and the screw-threads on the steering rod being extended the one into the other, whereby the screw-threads on the steering rod may travel into and out of the driving sleeve, and means for simultaneously driving the driving sleeve and nut-acting sleeve in reverse direction.

3. The combination with a pair of steering elements, of a steering rod interposed between the steering elements and swiveled thereto, a driving sleeve and a nut-acting sleeve mounted on the steering rod and held against axial movement, means including a key-way in the steering rod for securing the driving sleeve to the steering rod for rotation therewith, but with freedom for axial sliding movement thereon, said nut-acting sleeve having screw-threaded engagement with the steering rod, said key-way and the screw-threads on the steering rod being extended the one into the other, whereby the screw-threads on the steering rod may travel into and out of the driving sleeve, and means for simultaneously driving the driving sleeve and nut-acting sleeve in reverse direction.

In testimony whereof I affix my signature in presence of two witnesses.

JOHN R. KUNZELMAN.

Witnesses:
 BYRON RIPLEY,
 M. H. HEUSER.